(12) United States Patent
Osman

(10) Patent No.: US 8,616,973 B2
(45) Date of Patent: Dec. 31, 2013

(54) SYSTEM AND METHOD FOR CONTROL BY AUDIBLE DEVICE

(75) Inventor: Steven Osman, San Francisco, CA (US)

(73) Assignee: Sony Computer Entertainment Inc. (JP)

( * ) Notice: Subject to any disclaimer, the term of this patent is extended or adjusted under 35 U.S.C. 154(b) by 382 days.

(21) Appl. No.: 11/418,993

(22) Filed: May 4, 2006

(65) Prior Publication Data

US 2007/0060350 A1    Mar. 15, 2007

Related U.S. Application Data

(60) Provisional application No. 60/718,145, filed on Sep. 15, 2005.

(51) Int. Cl.
*A63F 9/24* (2006.01)

(52) U.S. Cl.
USPC .......................................................... 463/35

(58) Field of Classification Search
USPC ....................................................... 463/35–39
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger et al. | |
| 5,128,671 A | 7/1992 | Thomas, Jr. | |
| 5,463,565 A | 10/1995 | Cookson et al. | |
| 5,528,265 A | 6/1996 | Harrison | |
| 5,617,407 A | 4/1997 | Bareis | |
| 5,719,951 A | 2/1998 | Shackleton et al. | |
| 5,839,099 A | 11/1998 | Munsell et al. | |
| 6,154,559 A | 11/2000 | Beardsley | |
| 6,157,368 A | 12/2000 | Fager | |
| 6,219,645 B1 * | 4/2001 | Byers ............................ | 704/275 |
| 6,375,572 B1 | 4/2002 | Masuyama et al. | |
| 6,560,511 B1 * | 5/2003 | Yokoo et al. .................. | 700/245 |
| 6,665,644 B1 | 12/2003 | Kanevsky et al. | |
| 6,842,510 B2 | 1/2005 | Sakamoto | |
| 6,867,818 B2 | 3/2005 | Bray | |
| 6,872,139 B2 * | 3/2005 | Sato et al. ....................... | 463/39 |
| 6,884,171 B2 * | 4/2005 | Eck et al. ........................ | 463/42 |
| 6,889,383 B1 | 5/2005 | Jarman | |

(Continued)

FOREIGN PATENT DOCUMENTS

DE        44 39 257        10/1995
EP        0 978 301 A1    2/2000

(Continued)

OTHER PUBLICATIONS

S. Pfeiffer et al., "Automatic Audio Content Analysis", ACM Multimedia, 1996.

(Continued)

*Primary Examiner* — David L Lewis
*Assistant Examiner* — Eric M Thomas
(74) *Attorney, Agent, or Firm* — Lerner, David, Littenberg, Krumholz & Mentlik, LLP

(57) ABSTRACT

A system and method is provided for controlling a device through air pressure waves, or "sound". The system and method involve receiving a sound and analyzing the sound to determine whether or not it has one or more predetermined characteristics. If it is determined that the sound does have one or more predetermined characteristics, at least one control signal is generated for the purpose of controlling at least one aspect of the device.

21 Claims, 3 Drawing Sheets

(56) References Cited

U.S. PATENT DOCUMENTS

| | | | |
|---|---|---|---|
| 6,890,262 | B2 | 5/2005 | Oishi et al. |
| 7,046,139 | B2 | 5/2006 | Kuhn et al. |
| 7,081,579 | B2 | 7/2006 | Alcalde et al. |
| 7,233,933 | B2 | 6/2007 | Horvitz et al. |
| 7,472,424 | B2 | 12/2008 | Evans et al. |
| 2001/0027414 | A1 | 10/2001 | Azuma |
| 2002/0002483 | A1 | 1/2002 | Siegel et al. |
| 2002/0046030 | A1 | 4/2002 | Haritsa et al. |
| 2002/0078204 | A1 | 6/2002 | Newell et al. |
| 2002/0085097 | A1 | 7/2002 | Colmenarez et al. |
| 2002/0144259 | A1 | 10/2002 | Gutta et al. |
| 2002/0184098 | A1 | 12/2002 | Giraud et al. |
| 2003/0097659 | A1 | 5/2003 | Goldman |
| 2003/0126013 | A1* | 7/2003 | Shand ............................... 705/14 |
| 2003/0130035 | A1 | 7/2003 | Kanarat |
| 2003/0147624 | A1 | 8/2003 | Trajkovic et al. |
| 2003/0169907 | A1 | 9/2003 | Edwards et al. |
| 2003/0199316 | A1* | 10/2003 | Miyamoto et al. .............. 463/35 |
| 2004/0015998 | A1 | 1/2004 | Bokor et al. |
| 2004/0030553 | A1 | 2/2004 | Ito et al. |
| 2004/0193425 | A1 | 9/2004 | Tomes |
| 2004/0199387 | A1 | 10/2004 | Wang et al. |
| 2004/0201488 | A1 | 10/2004 | Elul |
| 2004/0212589 | A1 | 10/2004 | Hall et al. |
| 2006/0004640 | A1 | 1/2006 | Swierczek |
| 2006/0133624 | A1 | 6/2006 | Waserblat et al. |
| 2007/0021205 | A1* | 1/2007 | Filer et al. ........................ 463/36 |
| 2007/0061413 | A1 | 3/2007 | Larsen et al. |
| 2007/0061851 | A1 | 3/2007 | Deshpande et al. |
| 2007/0135187 | A1* | 6/2007 | Kreiner et al. ............. 455/575.2 |
| 2007/0243930 | A1 | 10/2007 | Zalewski et al. |
| 2007/0244751 | A1 | 10/2007 | Zalewski et al. |
| 2007/0255630 | A1 | 11/2007 | Zalewski et al. |
| 2007/0260517 | A1 | 11/2007 | Zalewski et al. |
| 2007/0261077 | A1 | 11/2007 | Zalewski et al. |

FOREIGN PATENT DOCUMENTS

| | | |
|---|---|---|
| EP | 1 079 615 | 2/2001 |
| FR | 2 814 965 | 4/2002 |
| WO | WO-00/01456 | 1/2000 |
| WO | 02/093917 | 11/2002 |

OTHER PUBLICATIONS

Office Action from U.S. Appl. No. 11/403,179, mailed Dec. 8, 2009.

Nathanael Rota and Monique Thonnat; "Video Sequence Interpretation for Visual Surveillance," Proc. of 3rd IEEE Int'l Workshop on Visual Surveillance, pp. 59-67, Dublin, Ireland, Jul. 1, 2000.

Gentile, Gary. "New DVD palyers can filter movie content", http://www.msnbc.msn.com/id/4780312, Apr. 2004.

Bolt, R.A., "Put-that-there": voice and gesture at the graphics interface, Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Unreal Tournament 2004 for Windows: Product Reviews, Apr. 3, 2004.

Sungbok Lee, Alexandros Potamianos, and Shrikanth Narayanan; Acoustics of Children's Speech: Developmental Changes of Temporal and Spectral Parameters, J. Acoust. Soc. Am. 105 (3), Mar. 1999.

http://faculty.augie.edu/~pchanavan/speech/Chapter6.ppt; Perry C. Hanavan; Chapter 6, Vocal Mechanism, Nov. 1998.

www-ccrma.stanford.edu/~pdelac/154/m154paper.htm; Pitch Detection Methods Review (printed on Feb. 14, 2006).

Richard J. Campbell and Patrick J. Flynn; A Survey of Free-Form Object Representation and Recognition Techniques; copyright 2001.

http://sail.usc.edu/publications/LePoNa_kidsAcous_JASA1999. pdf; Kazuo Hiyane and Jun Ilo, Mitsubishi Research Institute, Inc.; RWCP Sound Scene Database in Real Acoustical Environments Non-Speech Sound Recognition With Microphone Array, Copyright 1998-2001.

Schneiderman and Kanade, Robotics Institude—Face Detection, Project Descripton, www.ri.cmu.edu/projects/project_416.html, Sep. 2004.

* cited by examiner

SYSTEM AND METHOD FOR CONTROL BY AUDIBLE DEVICE

CROSS-REFERENCE TO RELATED APPLICATIONS

The present application claims benefit of U.S. Provisional Application No. 60/718,145, filed Sep. 15, 2005, the disclosure of which is hereby incorporated by reference herein; and the present application is related to concurrently filed commonly owned U.S. patent application Ser. No. 12/820,618 for SELECTIVE SOUND SOURCE LISTENING IN CONJUNCTION WITH COMPUTER INTERACTIVE PROCESSING, which is hereby incorporated by reference herein.

FIELD OF THE INVENTION

The present invention relates to controlling devices through the use of air pressure waves, and more particularly, to interacting with a video game through the use of air pressure waves.

BACKGROUND OF THE INVENTION

An important consideration in the design of video game systems is providing a way for users to interact with the system. Typically, a handheld controller having a number of buttons and/or a joystick is provided and a user interacts with the game by manipulating the buttons and/or joystick. For example, if the user is playing a game in which the user controls a displayed character, the user will press a "jump" button on a handheld controller to make the character jump.

FIG. 1 is a plan view of a person 5 playing a video game in accordance with the prior art. The FIG. 1 configuration includes a console 10 that is coupled to a television set 15 and a handheld controller 20. The television set includes a display screen 15' on which video game graphics generated by console 10 are displayed. The player's input to the game is conveyed through the manipulation of buttons or other control interfaces on the handheld controller 20. More specifically, the player's manipulations of the control interfaces on the handheld controller are converted to electrical signals that are relayed to the console 10. Through the received electrical signals the console can determine the player's desired action.

As depicted in FIG. 1, prior art video game systems require a coupling suitable for the transmission of electrical signals between the handheld controller and the console. In FIG. 1, such coupling is illustrated by a hardwired coupling 25. However, the coupling need not be a hardwired coupling. It could be, for example, an infra-red or wireless radio coupling. In any event, a coupling for transmitting electrical signals between the controller and console is necessary.

The requirement of an electrical coupling between the game controller and console has many drawbacks. In the case of hardwired connections, the wires are cumbersome and prone to tangling. Further, the wires can become disconnected if a player moves the handheld controller too far from the console. In the case of wireless connections, the corresponding handheld controllers generally require batteries and are therefore subject to battery failure. Moreover, the controllers used with electrical couplings, whether wired or wireless, are prone to liquid spills which can damage their circuitry. Still further, the controllers used with electrical couplings are expensive, thereby adding to the initial cost of the game system and making the controllers costly to replace.

In view of the drawbacks associated with prior video game controllers, the inventor of the present system and method has recognized that it is desirable to provide a video game controller that does not require an electrical coupling between the controller and the video game console.

SUMMARY OF THE INVENTION

A system and method is provided for controlling a device through air pressure waves. The system and method involve receiving an air pressure wave signal and analyzing the signal to determine whether or not it has one or more predetermined characteristics. If it is determined that the signal does have one or more predetermined characteristics, at least one control signal is generated for the purpose of controlling at least one aspect of the device.

BRIEF DESCRIPTIONS OF THE DRAWINGS

The following detailed description, given by way of example, but not intended to limit the invention solely to the specific embodiments described, may best be understood in conjunction with the accompanying drawings wherein like reference numerals denote like elements and parts, in which.

DETAILED DESCRIPTION

Prior to describing the present system and method in detail, it is noted that the term "sound" is used in the description and claims to refer to air pressure waves in general and is not limited to audible air pressure waves.

Figure 1:
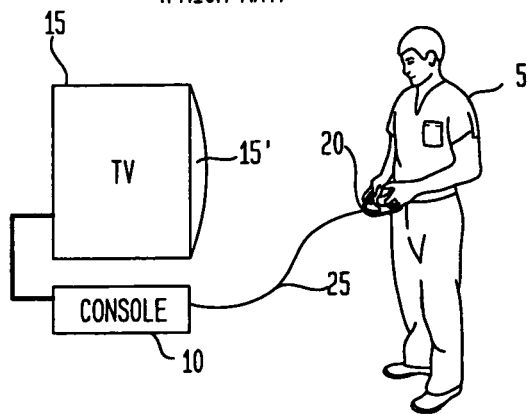
FIG. 1 is a plan view of a prior art video game system.
Figure 2A:
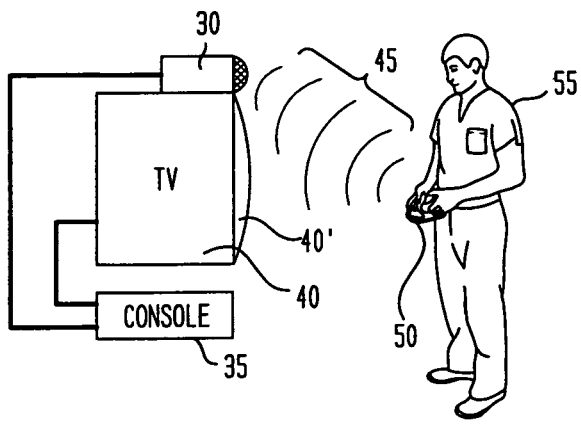
FIG. 2A is a plan view of a first embodiment including a microphone as a distinct element.

FIG. 2A is a plan view of a first embodiment including a microphone 30 as a distinct element. The microphone is coupled to a game console 35 which is, in turn, coupled to a television set 40. The television set includes a display screen 40' for displaying video game graphics generated by the game console.

The microphone of FIG. 2A is used to pick up sounds 45 generated by a sound-generating element 50 operated by a person 55 playing the video game. The sound-generating element is preferably a handheld controller that produces sounds of various frequencies, each sound being produced in response to the activation of a respective interface on the controller. For example, the controller may include three buttons, one for "jump," one for "move left," and one for "move right," each button generating an audible "click" of respective frequency "f1," "f2," or "f3" when pressed. In another example, the controller may include a joystick that produces an audible click having a frequency dependent on the position to which the joystick is moved. For instance, moving the joystick to the 0 degree (12 o'clock) position produces a click of a first frequency "f1," to the 90 degree (3 o'clock) position produces a click of a second frequency "f2," to the 180 degree (6 o'clock) position produces a click of a third frequency. "f3," and so on.

In any event, sounds generated by controller 50 are picked up by microphone 30 and converted to electrical signals. The electrical signals are passed to the console 35 and based on the characteristics of the electrical signals received the game console controls one or more aspects of the video game. Thus, in the example of a "jump" button that generates a sound of frequency "f1" when pressed, when the console determines that a sound of frequency "f1" has been picked up by the microphone, the console will cause a video game character to jump in response to the determination. In this manner, interaction between a person and a video game is achieved without the need for an electrical coupling between the controller and game console. Rather, the controller and game console are coupled through sound.

In a preferred embodiment, the microphone is positioned in close proximity to the display screen so that a person playing the video game will be facing the microphone and the sounds generated by the handheld controller will be directed toward the microphone.

It should be noted that the coupling between the microphone and console is not limited to a hardwired coupling, or to a hardwired coupling of any particular type. Indeed, the coupling can be in the form of twisted-shielded-pair wiring, coaxial cable, fiber optic cable, wireless link, and the like. Similarly, the coupling between the console and television is not limited to any one particular type of coupling.

Further, it should be noted that the controller is not limited to a handheld controller with hand operated interfaces. In a preferred alternative embodiment, the controller is air activated such that by blowing into the controller a person produces a sound that causes the game to react accordingly. For example, a whistle is provided that produces a sound of frequency "fw." When a person is within range of the game microphone and blows into the whistle, the console takes action commensurate with the detection of a sound having frequency "fw." It is envisioned that such a whistle could be given away as a promotional item such as the small toys that are included in cereal boxes or the toys given away at fast-food restaurants. A customer could then use the whistle they obtain as part of a promotion to gain an advantage in a video game such as obtaining a secret weapon or opening a hidden door.

Moreover, it should be noted that the amplitude of sound produced by a controller may be used as a control parameter. For example, the controller may be a whistle that produces sound of amplitude proportional to the force with which a user blows into the whistle. The whistle could be used to control a displayed video game character such that the character's speed of movement is proportional to the sound amplitude, the character moving faster when the amplitude is high and slower when the amplitude is low.

Figure 2B:
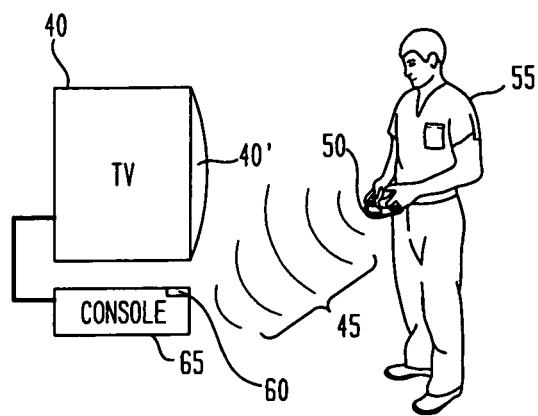
FIG. 2B is a plan view of a second embodiment in which a microphone is provided as part of a game console.

FIG. 2B is a plan view of a second embodiment in which a microphone 60 is provided as part of a game console 65. Since the microphone is integral with the game console, there is no need for an external coupling between the microphone and console. In all other respects, the embodiment of FIG. 2B is implemented in the same manner as the embodiment of FIG. 2A.

In both the FIG. 2A and FIG. 2B embodiments, the microphone is not limited to a single microphone element. For example, the microphone may be made up of an array of microphone elements.

Figure 3A:
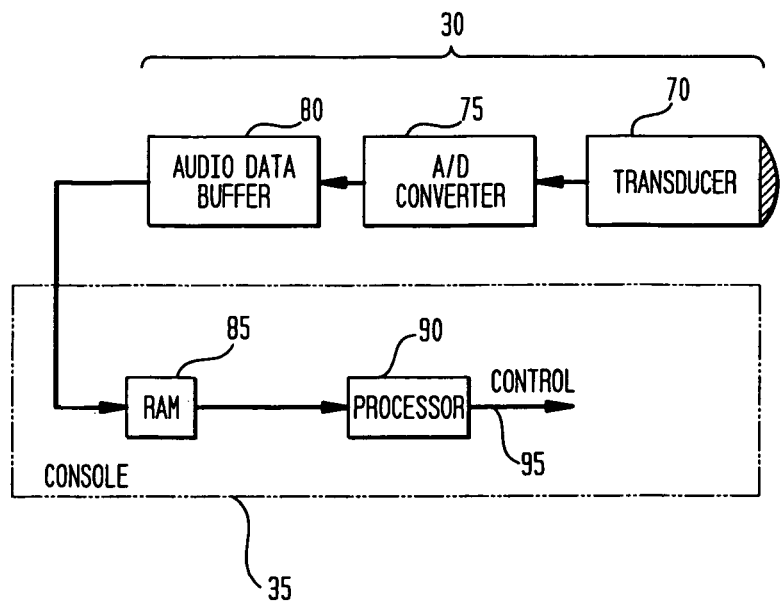
FIG. 3A is a block diagram useful in describing the operation of the FIG. 2A embodiment.

FIG. 3A is a block diagram useful in describing the operation of the FIG. 2A embodiment. As can from FIG. 3A, the microphone 30 includes a transducer 70, an Analog-to-Digital (A/D) converter 75, and a data buffer 80. Sounds picked up by the transducer are converted to analog electrical signals. The analog electrical signals are passed to the A/D converter where they are converted into digital electrical signals.

The digital electrical signals are made up of a multiple of sequential temporal samples, each sample being quantized and represented by a binary number. In a preferred embodiment, the samples of the analog signal are taken at a rate of ≥40 KHz such that analog signals of 20 KHz—the commonly accepted upper frequency limit of human hearing—can be represented by the samples without aliasing. Nevertheless, the sampling rate is not limited to being ≥40 KHz. For instance, if no sound of frequency >15 KHz is to be used as a control sound, then samples of the analog signal can be taken at a rate of 30 KHz (the Nyquist rate) without aliasing.

In any case, the samples generated by the A/D converter are stored in the data buffer prior to being passed to a RAM 85 within the game console. Once the samples have been passed to RAM 85, they can be analyzed by a processor 90 within the console. In a preferred embodiment, the processor operates on subsets of the samples to determine for each subset whether or not the subset includes one or more predetermined control tones. More specifically, the processor performs a frequency transformation on a subset of samples, and if it is determined that the subset includes a tone corresponding to an action, the processor generates a control signal 95 to implement the action. In the example of a "jump" action being denoted by a frequency "f1," if the processor detects a tone of frequency "f1" within the spectral content of a given subset, the processor determines that the sound corresponding to the "jump" command was detected during the time period of that subset and consequently generates a control signal that causes an on-screen character to jump.

More than one predetermined control tone may be present in a subset. In such event, the processor issues the control signals necessary to implement the actions associated with all the detected tones. For example, if predetermined tones of "f1" and "f2" are detected for a given subset, and "f1" is associated with "jump" while "f2" is associated with "move left," the processor will issue control signals to cause an on-screen character to jump to the left.

Figure 3B:
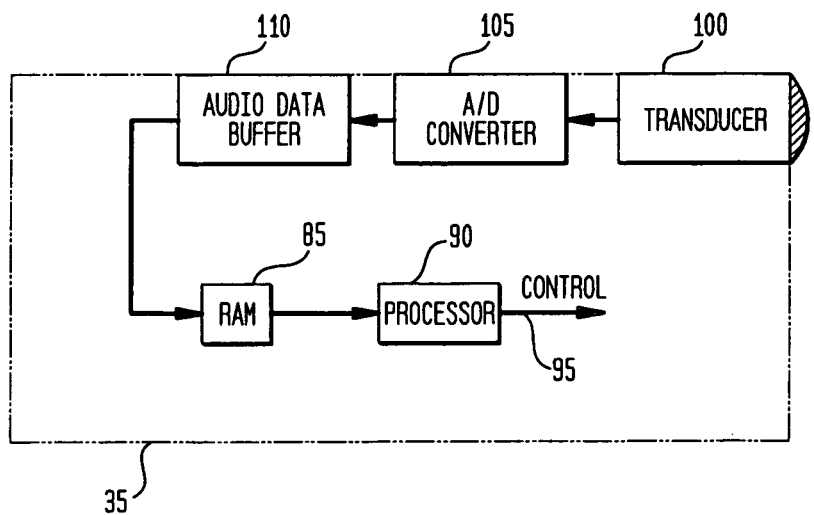
FIG. 3B is a block diagram useful in describing the operation of the FIG. 2B embodiment.

FIG. 3B is a block diagram useful in describing the operation of the FIG. 2B embodiment. The data handling operations of FIG. 3B are the same as those discussed in connection with FIG. 3A. The only difference between FIGS. 3A and 3B is the inclusion of transducer 100, A/D converter 105 and audio data buffer 110 within the console rather than outside the console.

Figure 4:
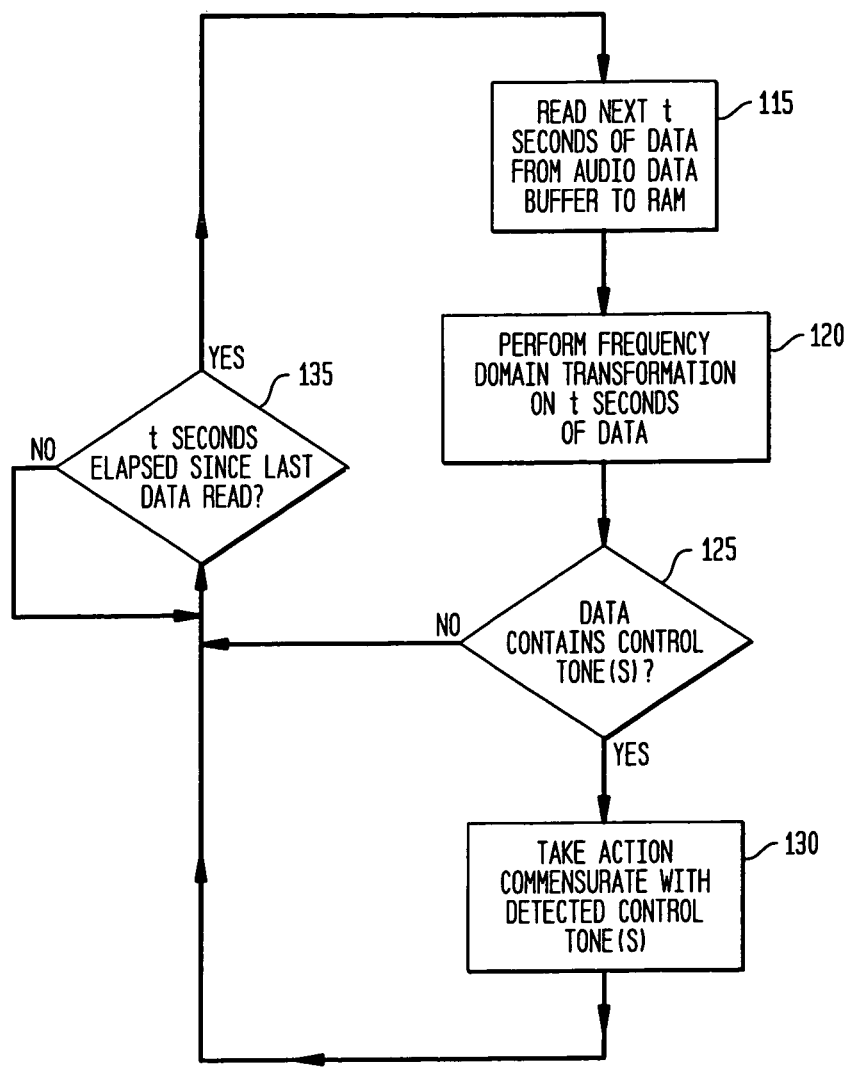
FIG. 4 is a flow chart showing the steps included in an audio data analysis scheme of a preferred embodiment.

FIG. 4 is a flow chart showing the steps included in a data analysis scheme of a preferred embodiment. As a first step, "t" seconds worth of digital data samples captured by the microphone are read from the data buffer to the RAM (step 115). Thus, for a sampling rate of 40 KHz and a value of "t=0.25 seconds," 10,000 samples are read from the buffer into the RAM. Next, a frequency domain transformation is performed on the samples read into the RAM (step 120), and the resulting spectral content is analyzed to determine if one or more control tones are present in the content (step 125). If the analyzed data contains control tones, the processor generates one or more control signals directing the system to take action commensurate with the detected control tones (step 130). Once any necessary control signals have been generated, or a determination has been made that no control tones are present in the data, the process checks to see if "t" seconds have elapsed since the last data read (step 135). If "t" seconds have elapsed, the process reads the next "t" seconds worth of data into the RAM (step 115). If "t" seconds have not elapsed, the process waits until "t" seconds have elapsed before conducting the next read. In this manner, it is assured that "t" seconds of data is always available for reading from the buffer to the RAM.

As these and other variations and combinations of the features discussed above can be utilized without departing from the present invention as defined by the claims, the foregoing description of the preferred embodiments should be taken by way of illustration rather than by way of limitation of the invention as defined by the claims. For example, the present system and method is not limited to a data analysis scheme that includes a frequency domain transformation, and is not limited to a data analysis scheme that includes the detection of one or more control tones. Indeed, the analysis could be performed exclusively in the time domain or can make use of both domains. Moreover, the data analysis is not limited to detecting predetermined control tones. For instance, the analysis may include the detection of time domain or frequency domain patterns that are not distinguishable solely on the presence or absence of one or more predetermined tones.

Further, it is noted that the present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited to light emission from light sources, sound distortion means, or other suitable transmitters and modulators as well as buttons, pressure pads, etc. that may influence the transmission or modulation of the same, encode state, and/or transmit commands from or to the device being tracked.

Still further, it is noted that in the video game embodiment of the invention the console is not a necessary element. For example, the elements that are included within the console may be alternatively integrated within the television set, integrated within the handheld controller, or integrated within both the television set and handheld controller.

In addition, the present system and method is not limited to video games, but rather, is applicable to device control in general. For example, a sound-based controller can be use to remotely control a television set.

The invention claimed is:

1. A system for controlling a device through sound, comprising:
   a transducer for receiving sound and converting the sound into an electrical signal; and
   a processor for analyzing the electrical signal to determine whether or not the electrical signal includes at least one control tone of a fixed frequency, and for generating at least one control signal when it is determined that the electrical signal does include at least one control tone of a fixed frequency, the control signal(s) being generated proportional to an amplitude of the electrical signal and being used to control at least one aspect of the device other than sound generation, such that an action performed in response to the control signal is performed in proportion to the amplitude of the electrical signal.

2. The system according to claim 1, further comprising an A/D converter for converting the electrical signal generated by the transducer into a plurality of digital samples, and wherein the processor analyzes the plurality of digital samples.

3. The system according to claim 2, wherein the processor performs a frequency domain transformation on the digital samples.

4. The system according to claim 1, wherein the device is a video game system including a video game console, the transducer is located outside the console, and the processor is located within the console.

5. The system according to claim 1, wherein the device is a video game system including a video game console, and the transducer and processor are located inside the console.

6. The system according to claim 1, further comprising an A/D converter for performing A/D conversion on signals received from the transducer and a buffer for storing digital samples generated by the A/D converter.

7. The system according to claim 1, further comprising a sound-generating element.

8. The system according to claim 7, wherein the sound-generating element is a handheld controller.

9. The system according to claim 7, wherein the sound-generating element is a whistle.

10. A method for controlling a device through sound, comprising the steps of:
    receiving sound;
    converting the sound into an electrical signal;
    analyzing the electrical signal to determine whether or not the electrical signal includes at least one control tone of a fixed frequency; and
    generating at least one control signal when it is determined that the electrical signal does include at least one control tone of a fixed frequency, the control signal(s) being generated proportional to an amplitude of the electrical signal and being used to control at least one aspect of the device other than sound generation, such that an action performed in response to the control signal is performed in proportion to the amplitude of the electrical signal.

11. The method according to claim 10, wherein the step of converting comprises converting the sound into a plurality of digital samples.

12. The method according to claim 11, wherein the step of analyzing comprises performing a frequency domain transformation on the digital samples.

13. A video game system in which a player interacts with the system through sound, comprising:
    a sound-generating element for producing sound in response to manipulation by the player;
    a transducer for receiving the sound generated by the sound-generating element and converting the sound to an electrical signal; and
    a processor for analyzing the electrical signal to determine whether or not the electrical signal includes at least one control tone of a fixed frequency, and for generating at least one control signal when it is determined that the electrical signal does include at least one control tone of a fixed frequency, the control signal(s) being generated proportional to an amplitude of the electrical signal and being used to control at least one aspect of the video game system other than sound generation, such that an action performed in response to the control signal is performed in proportion to the amplitude of the electrical signal.

14. The system according to claim 13, further comprising an A/D converter for receiving the electrical signal generated by the transducer and converting the electrical signal into a plurality of digital samples, and wherein the processor analyzes the digital samples.

15. The system according to claim 14, wherein the processor performs a frequency domain transformation on the digital samples.

16. The system according to claim 13, wherein the sound-generating element is a handheld controller.

17. The system according to claim 13, wherein the sound-generating element is a whistle.

18. A system for controlling a device through sound, comprising a processor for analyzing a received sound to determine whether or not the sound includes at least one control tone of a fixed frequency, and for generating at least one control signal when it is determined that the sound includes at least one control tone of a fixed frequency, the control signal(s) being generated proportional to an amplitude of the sound and being used to control at least one aspect of the device other than sound generation, such that an action performed in response to the control signal is performed in proportion to the amplitude of the electrical signal.

19. The system according to claim 18, further comprising a transducer for converting the received sound into an electrical signal, and wherein the processor analyzes the electrical signal to determine whether or not the sound includes at least on e control tone of a fixed frequency.

20. A method for controlling a device through sound, comprising the steps of:

receiving sound;

analyzing the sound to determine whether or not the sound includes at least one control tone of a fixed frequency; and generating at least one control signal when it is determined that the sound does include at least one control tone of a fixed frequency, the control signal(s) being generated proportional to an amplitude of the sound and being used to control at least one aspect of the device other than sound generation, such that an action performed in response to the control signal is performed in proportion to the amplitude of the electrical signal.

21. The method according to claim 20, further comprising the step of converting the sound into and electrical signal, and wherein the step of analyzing comprises analyzing the electrical signal to determine whether or not the sound includes at least one control tone of a fixed frequency.

\* \* \* \* \*

UNITED STATES PATENT AND TRADEMARK OFFICE
CERTIFICATE OF CORRECTION

| | |
|---|---|
| PATENT NO. | : 8,616,973 B2 |
| APPLICATION NO. | : 11/418993 |
| DATED | : December 31, 2013 |
| INVENTOR(S) | : Steven Osman |

It is certified that error appears in the above-identified patent and that said Letters Patent is hereby corrected as shown below:

In the Claims

Column 7, line 17, "on e" should read --one--.
Column 8, line 15, "and" should read --an--.

Signed and Sealed this
Twenty-fifth Day of August, 2015

Michelle K. Lee
*Director of the United States Patent and Trademark Office*